(12) United States Patent
Miao et al.

(10) Patent No.: US 9,578,315 B2
(45) Date of Patent: Feb. 21, 2017

(54) METHOD AND SYSTEM FOR JUDGING IN A 3D IMAGING ENVIRONMENT

(71) Applicant: Wistron Corporation, New Taipei (TW)

(72) Inventors: Pen-Tai Miao, New Taipei (TW); Ping-Hung Chen, New Taipei (TW); Shih-Ming Hsu, New Taipei (TW); Li-Yu Yang, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 297 days.

(21) Appl. No.: 14/570,335

(22) Filed: Dec. 15, 2014

(65) Prior Publication Data

US 2015/0334381 A1 Nov. 19, 2015

(30) Foreign Application Priority Data

May 19, 2014 (TW) .............................. 103117481 A

(51) Int. Cl.
*H04N 13/04* (2006.01)
*G06T 15/00* (2011.01)
*H04N 13/00* (2006.01)

(52) U.S. Cl.
CPC ......... *H04N 13/0429* (2013.01); *G06T 15/005* (2013.01); *H04N 13/044* (2013.01); *H04N 13/0425* (2013.01); *H04N 13/0434* (2013.01); *H04N 13/0438* (2013.01); *H04N 2013/0074* (2013.01); *H04N 2213/008* (2013.01)

(58) Field of Classification Search
CPC .............. H04N 5/2258; H04N 13/0074; H04N 13/0425; H04N 13/0434
See application file for complete search history.

(56) References Cited

U.S. PATENT DOCUMENTS

| | | | |
|---|---|---|---|
| 2005/0231590 A1* | 10/2005 | Iwasaki .............. | H04N 13/0217 348/47 |
| 2012/0127283 A1* | 5/2012 | Kim ....................... | G02B 27/26 348/51 |
| 2013/0329262 A1* | 12/2013 | Yamane ............. | H04N 1/00832 358/448 |
| 2014/0063187 A1* | 3/2014 | Tsukagoshi ........ | H04N 13/0059 348/43 |

* cited by examiner

*Primary Examiner* — Tracy Y Li
*Assistant Examiner* — Fabio Lima
(74) *Attorney, Agent, or Firm* — Brinks Gilson & Lione; John C. Bacoch

(57) ABSTRACT

A method for judging in a 3D environment includes: receiving a first image and a second image of a displayed 3D image, the first image being captured without the aid of 3D glasses, the second image being captured with the 3D glasses arranged in front of an image capturing unit; processing each of the first and second images so as to obtain a respective one of a processed first image and a processed second image; and determining whether a number of enclosed areas contained in the processed first image is equal to a predetermined value, and whether a number of enclosed areas contained in the processed second image is equal to another predetermined value. The 3D environment is normal when results of determinations are affirmative.

18 Claims, 13 Drawing Sheets

METHOD AND SYSTEM FOR JUDGING IN A 3D IMAGING ENVIRONMENT

CROSS-REFERENCE TO RELATED APPLICATION

This application claims priority of Taiwanese Patent Application No. 103117481, filed on May 19, 2014, the entire disclosure of which is incorporated herein by reference.

FIELD OF THE INVENTION

The invention relates to an image analysis technique, more particularly to a method and a system for judging in a three-dimensional (3D) imaging environment.

BACKGROUND OF THE INVENTION

Three-dimensional (3D) imaging technique, i.e., stereoscopy, is based on a principle that two offset images are separately presented to the left and right eyes of a viewer, and a 3D effect may be perceived in the viewer's brain upon combining the two offset images.

Taking the polarized 3D system as an example, the viewer is required to wear polarized 3D glasses. During presentation of 3D images, two polarized beams of light are projected in a superimposed manner onto the same screen of a display. Each of two lenses on the polarized 3D glasses passes only a respective one of the two polarized beams of light. In this way, the left and right eyes may respectively receive the two polarized beams of light associated respectively with two offset images, so that the brain perceives a 3D effect.

On the other hand, the active shutter 3D system is realized by displaying alternating left-eye images and right-eye images. Meanwhile, an active shutter 3D glasses is controlled by a corresponding timing signal to alternately block a right lens and a left lens of the active shutter 3D glasses such that the left eye and the right eye of the viewer who wears the active shutter 3D glasses may receive the left-eye images and the right-eye images respectively in an alternating manner. In this way, the 3D effect is perceived in the brain of the viewer.

However, at present, since whether a display is actually operating in a 3D mode and whether a 3D imaging environment is functioning normally are determined by a human being, human misjudgment is inevitable.

SUMMARY OF THE INVENTION

Therefore, an object of the present invention is to provide an automated method for judging in a three-dimensional (3D) imaging environment. The method is capable of preventing human misjudgment and effectively saving human resources and testing time. The 3D environment uses a display unit to display a predetermined 3D image. The predetermined 3D image includes a left-eye image and a right-eye image. Each of the left-eye image and the right-eye image contains a pattern that defines a preset number of enclosed areas of a respective one of the left-eye image and the right-eye image.

Accordingly, the method of the present invention is to be implemented by a processor and comprises the steps of:

(A) receiving, by the processor, a first image and a second image of the predetermined 3D image displayed by the display unit, the first image being captured by an image capturing unit without the aid of 3D glasses, the second image being captured by the image capturing unit with the 3D glasses arranged in front of the image capturing unit;

(B) processing, by the processor, each of the first image and the second image so as to obtain a respective one of a processed first image and a processed second image;

(C) obtaining, by the processor, a number of enclosed areas contained in the processed first image, and a number of enclosed areas contained in the processed second image; and (D) determining, by the processor, whether the number of the enclosed areas contained in the processed first image is equal to a predetermined number of enclosed areas associated with a standard first image, and whether the number of the enclosed areas contained in the processed second image is equal to a predetermined number of enclosed areas associated with a standard second image;

wherein the 3D imaging environment is functioning normally when results of determinations made by the processor in step (D) are affirmative.

Another object of the present invention is to provide an automated system for judging in a three-dimensional (3D) imaging environment. The system is capable of preventing human misjudgment and effectively saving human resources and testing time. The 3D imaging environment uses a display unit to display a predetermined 3D image. The predetermined 3D image includes a left-eye image and a right-eye image. Each of the left-eye image and the right-eye image contains a pattern that defines a preset number of enclosed areas of a respective one of the left-eye image and the right-eye image.

Accordingly, the system of the present invention comprises 3D glasses, an image capturing unit, and a processor. The image capturing unit captures a first image of the predetermined 3D image displayed by the display unit without the aid of the 3D glasses, and captures a second image of the predetermined 3D image displayed by the display unit with the 3D glasses arranged in front of the image capturing unit. The processor is coupled to the image capturing unit and is configured to receive the first image and the second image of the predetermined 3D image displayed by the display unit, process each of the first image and the second image so as to obtain a respective one of a processed first image and a processed second image, obtain a number of enclosed areas contained in the processed first image, and a number of enclosed areas contained in the processed second image, and determine whether the number of the enclosed areas contained in the processed first image is equal to a predetermined number of enclosed areas associated with a standard first image, and whether the number of the enclosed areas contained in the processed second image is equal to a predetermined number of enclosed areas associated with a standard second image. The 3D imaging environment is functioning normally when results of determinations made by the processor are affirmative.

An effect of the present invention resides in that, by virtue of processing the first image that is captured without the aid of the 3D glasses and the second image that is captured with the 3D glasses arranged in front of the image capturing unit, and by virtue of obtaining the number of the enclosed areas contained in the processed first image and the number of the enclosed areas contained in the processed second image for subsequent comparison, whether the 3D imaging environment is functioning normally may be judged automatically. In this way, human misjudgment is prevented so as to promote accuracy of the result. Moreover, the present invention is applicable to most 3D products on the market.

BRIEF DESCRIPTION OF THE DRAWINGS

Other features and advantages of the present invention will become apparent in the following detailed description of embodiments with reference to the accompanying drawings, of which.

DETAILED DESCRIPTION OF THE EMBODIMENTS

Figure 1:
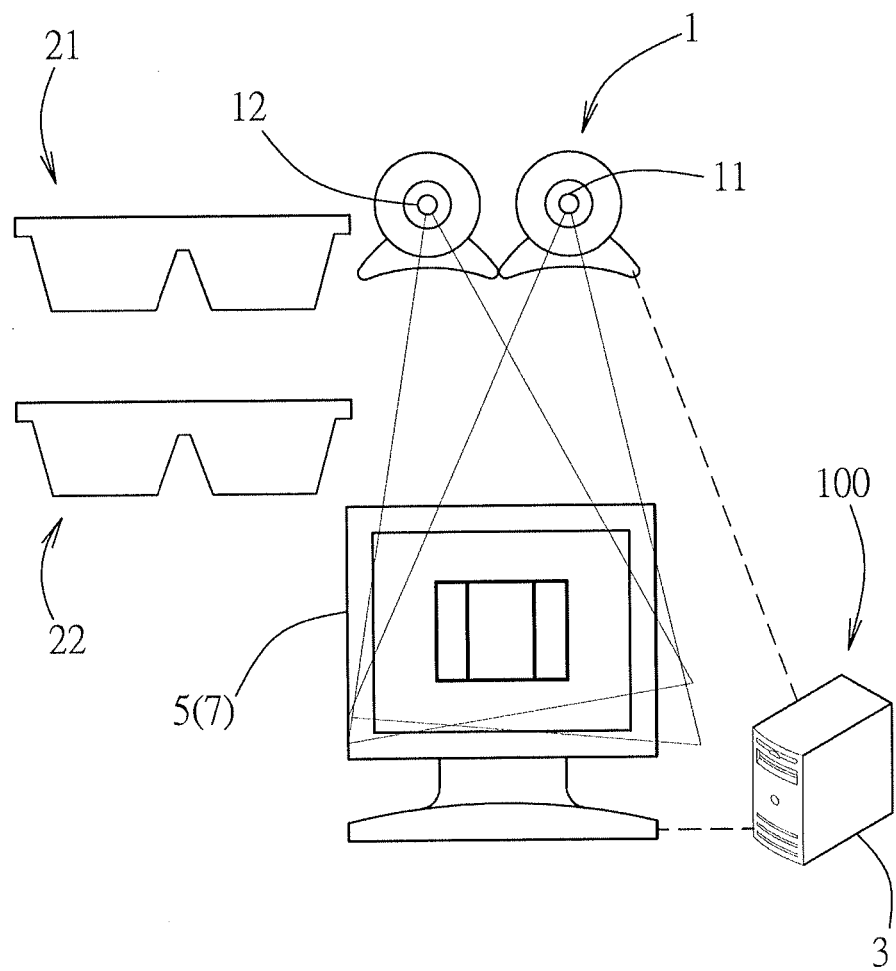
FIG. 1 is a schematic diagram illustrating an embodiment of a system for judging in a three-dimensional (3D) imaging environment according to the present invention.
Figure 2:
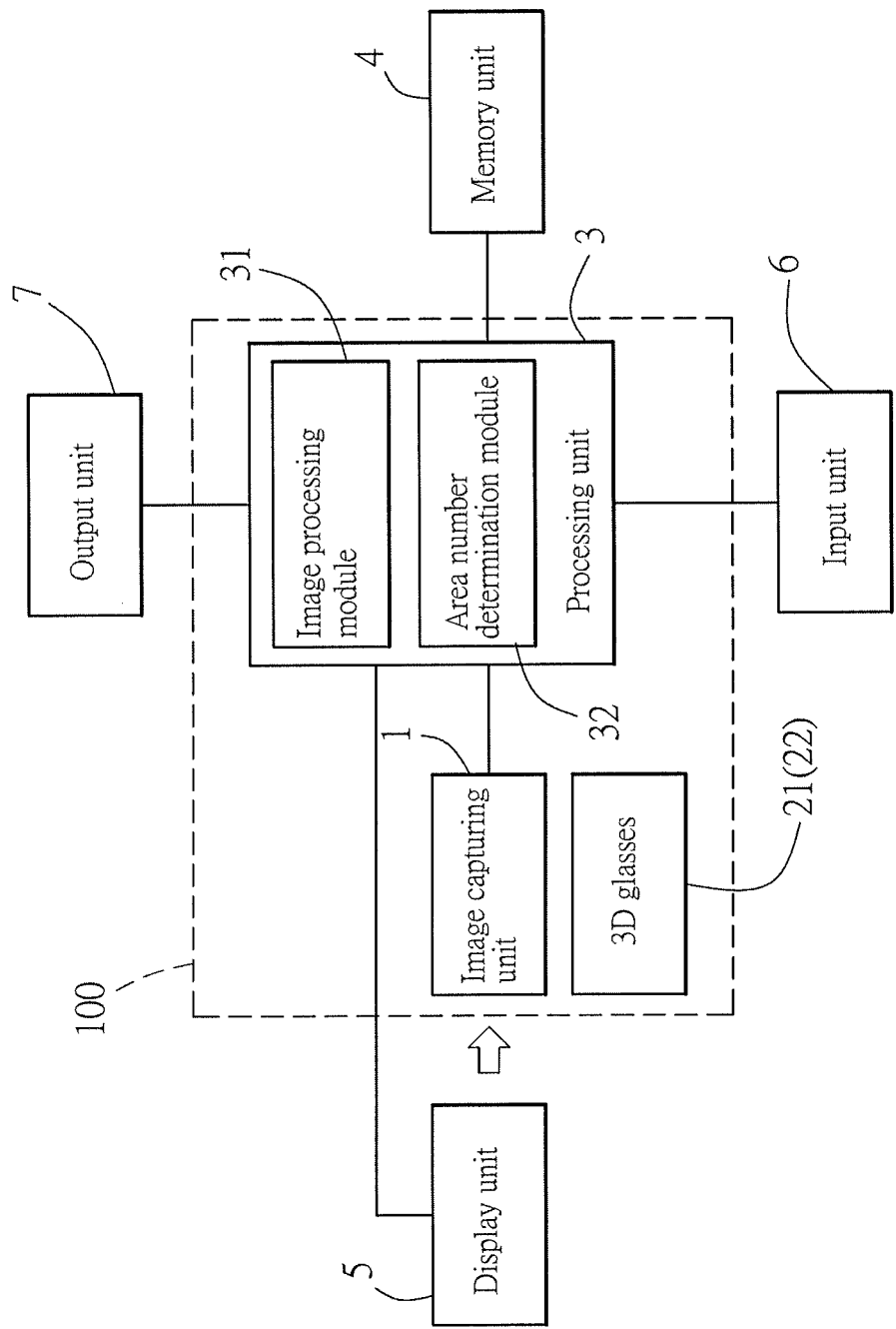
FIG. 2 is a block diagram illustrating the embodiment of the system according to the present invention.

Referring to FIG. 1 and FIG. 2, a first embodiment of a system 100 for judging in a three-dimensional (3D) imaging environment according to the present invention supports both polarized 3D display technology and active shutter 3D technology. The system 100 comprises an image capturing unit 1, a pair of polarized 3D glasses 21 and a pair of active shutter 3D glasses 22 which both are removably arranged in front of the image capturing unit 1, and a processing unit (i.e., a processor) 3 which is coupled to the image capturing unit 1. The term "coupled" as used herein stands for communication of signals between two components, and is not limited to physical wired connections. The image capturing unit 1 of this embodiment is adopted to simulate a pair of human eyes, and includes a left camera lens 11 and a right camera lens 12 which respectively represent a left eye and a right eye. It is noted that even though the two left and right camera lenses 11 and 12 are taken as example for simulation of human eyes in this embodiment as illustrated in FIG. 1, only a single camera lens is required to simulate one eye for subsequent determination algorithms. Processes for the subsequent determination algorithms will be explained hereinafter based on a result captured by the single camera lens.

The system 100 is configured to judge in a 3D imaging environment that uses a display unit 5 to display a predetermined 3D image. Regardless of the polarized 3D technology or the active shutter 3D technology being adopted, the predetermined 3D image includes a left-eye image which is preset to be viewed by the left eye of a viewer, and a right-eye image which is preset to be viewed by the right eye of the viewer. Each of the left-eye image and the right-eye image contains a pattern that defines a preset number of enclosed areas of a respective one of the left-eye image and the right-eye image. For example, the pattern contained in an image is a circle, and the circle defines two enclosed areas of the image, i.e., an area inside the circle, and an area outside the circle and inside a border of the image.

In this embodiment, the predetermined 3D image is played back by the processing unit 3 and is outputted by the display unit 5. Alternatively, the predetermined 3D image may be played back by a player (not shown) different from the processing unit 3 and then outputted by the display unit 5.

Specifically, when the system 100 is utilized to judge whether one of the display unit 5, a file associated with the predetermined 3D image, and the polarized 3D glasses 21 which adopt the polarized 3D technology operates normally, the display unit 5 is a polarized 3D display which displays the left-eye image by virtue of a polarized beam of light, and the right-eye image by virtue of another polarized beam of light. Since the left camera lens 11 or the right camera lens 12 of the image capturing unit 1 is able to receive these two polarized beams of light, an image containing the left-eye image and the right-eye image which are partially overlapped may be captured. Such an image is also known as a superimposed image. In this embodiment, one of the left camera lens 11 and the right camera lens 12 of the image capturing unit 1 captures a first image of the predetermined 3D image displayed by the display unit 5 without the aid of the polarized 3D glasses 21. In the following paragraphs, the first image is referred to as a bare-eye image hereinafter. Particularly, the bare-eye image contains superimposed patterns which define enclosed areas of the bare-eye image. The number of the enclosed areas defined by the superimposed patterns in the bare-eye image is different from the number of the enclosed areas defined by the pattern in the left-eye image or the right-eye image.

When the polarized 3D glasses 21 is arranged in front of one of the left and right camera lenses 11 and 12 of the image capturing unit 1, the left camera lens 11 can only capture the left-eye image, and the right camera lens 12 can only capture the right-eye image. In this embodiment, one of the left camera lens 11 and the right camera lens 12 of the image capturing unit 1 captures a second image of the predetermined 3D image with the polarized 3D glasses 21 arranged in front of the image capturing unit 1. In the following paragraphs, the second image is referred to as a behind-glass image hereinafter.

When the system 100 is utilized to determine whether each of the display unit 5, the file associated with the predetermined 3D image, and the active shutter 3D glasses 22 which adopt the active shutter 3D technology is functioning normally, the display unit 5 is an active shutter 3D display which displays the left-eye image and the right-eye image in an alternating manner. Since a shutter speed (i.e., the time for which a shutter remains open) of one of the left and right camera lenses 11 and 12 of the image capturing unit 1 is greater than a switching cycle of the left-eye image and the right-eye image that are displayed alternately by the display unit 5 (that is to say, the frequency of alternating display of the display unit 5 is relatively high), the bare-eye image captured thereby thus contains the left-eye image and the right-eye image which are partially overlapped. In this way, the bare-eye image contains superimposed patterns which define enclosed areas. The number of the enclosed areas defined by the superimposed patterns in the bare-eye image is different from the number of the enclosed areas defined by the pattern in the left-eye image or the right-eye image.

When the active shutter 3D glasses 22 is arranged in front of the left and right camera lenses 11 and 12 of the image capturing unit 1, taking the left camera lens 11 as an example, the left camera lens 11 ideally only captures the left-eye image as a result of a left lens of the active shutter 3D glasses 22 allowing passage of the polarized beam of light (i.e., opened). Therefore, the behind-glass image thus captured ideally does not contain superimposed images. However, in practice, if a non-customized equipment is adopted for the 3D imaging environment, the shutter speed of the image capturing unit 1 may not necessarily be synchronized with the active shutter 3D glasses 22. In this way, the behind-glass image thus captured usually contains the left-eye image and a portion of the right-eye image. The following paragraphs illustrate an ideal situation, that is, the shutter speed of the image capturing unit 1 is synchronized with the active shutter 3D glasses 22. As to the right camera lens 12, a similar situation applies.

Figure 3:
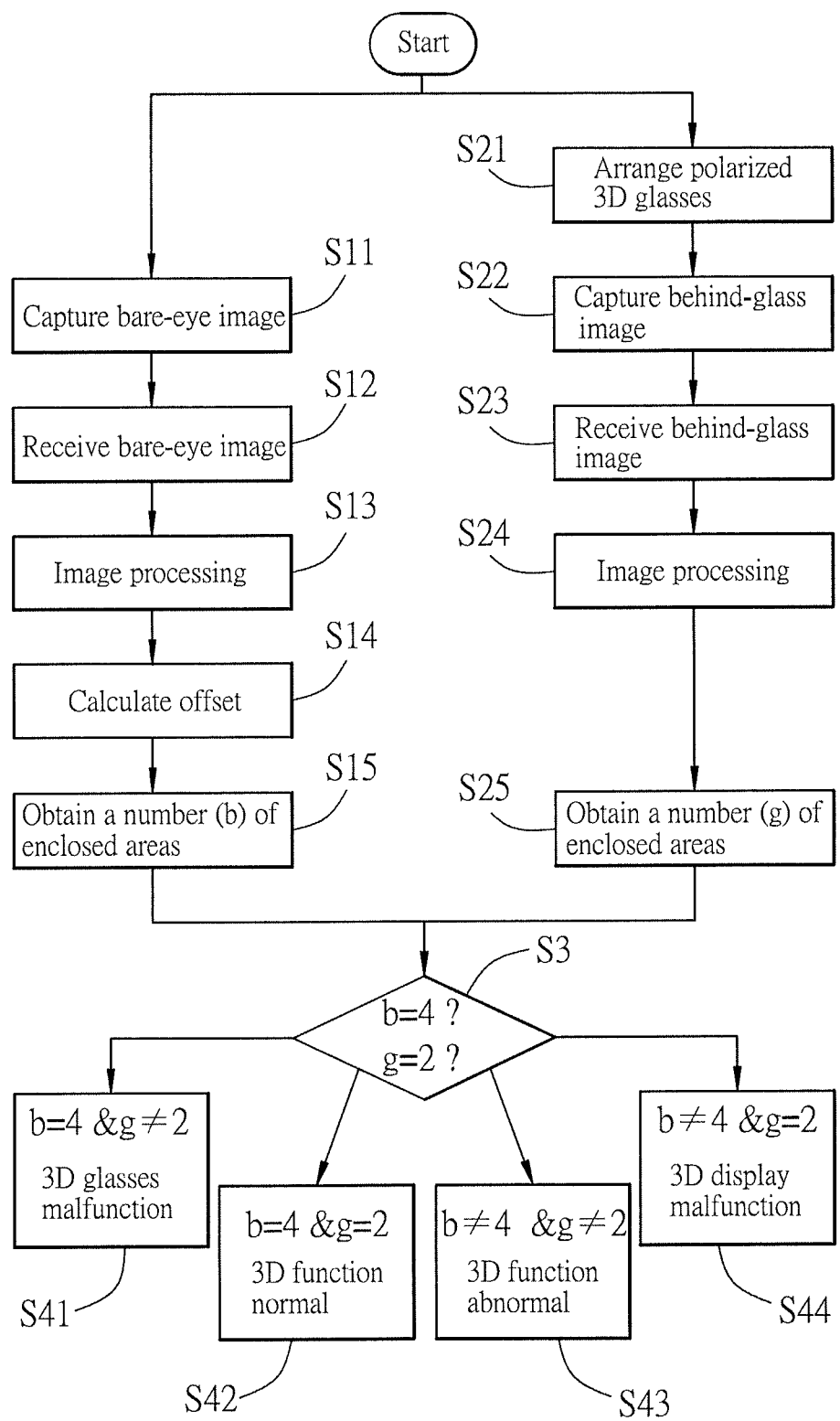
FIG. 3 is a flow chart illustrating an embodiment of a method for judging in a 3D imaging environment which adopts polarized 3D technology according to the present invention.
Figure 6:
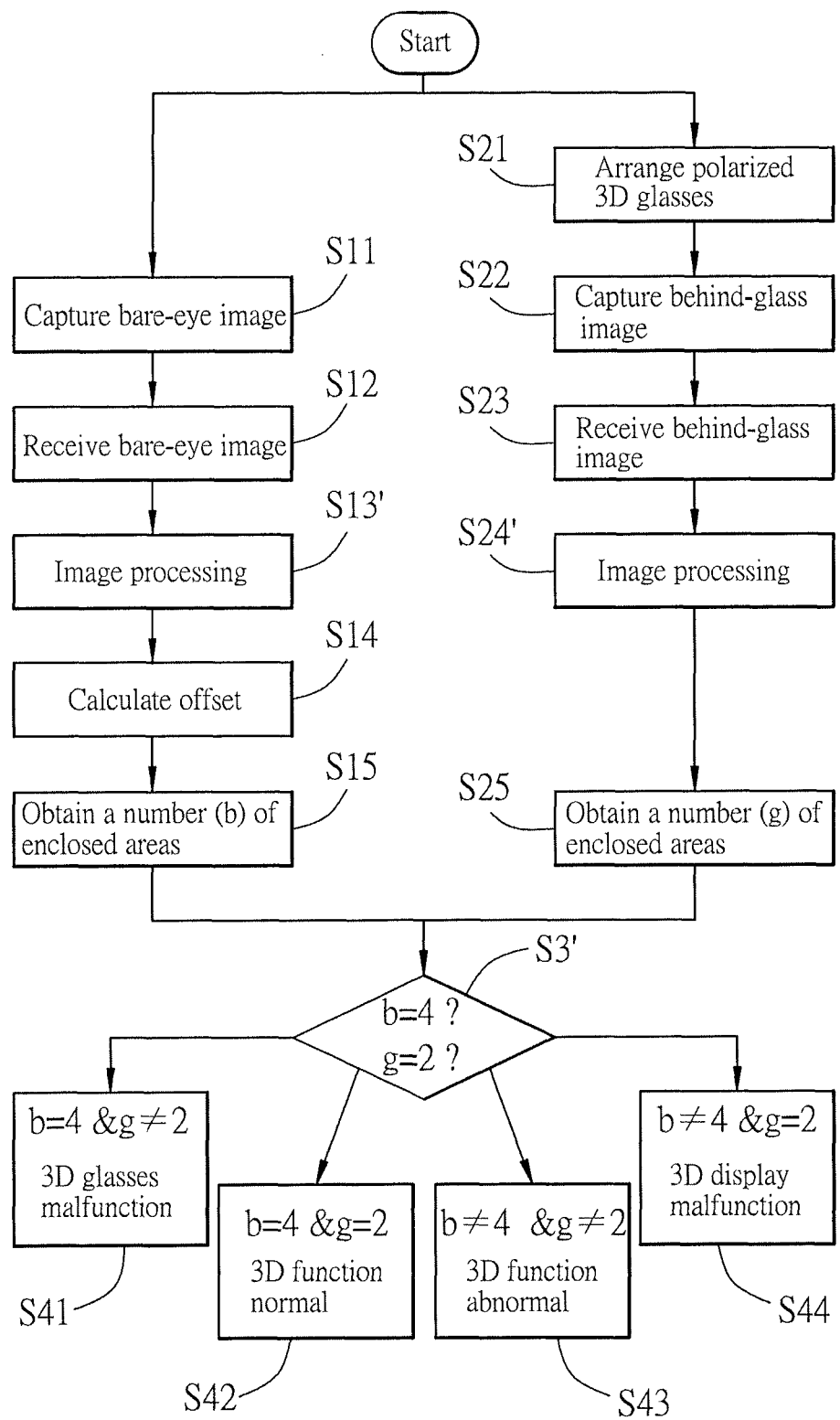
FIG. 6 is a flow chart illustrating the embodiment of the method for judging in a 3D imaging environment which adopts active shutter 3D technology according to the present invention.

In this embodiment, whether the 3D imaging environment is functioning normally may be judged by analyzing the bare-eye image and the behind-glass image. It is noted that, even though the system 100 of this embodiment supports both the polarized 3D technology and the active shutter 3D technology, a practical implementation of the present invention is not limited to supporting these two technologies at the same time. The system 100 may be designed to be applicable to a polarized 3D display product and to only execute steps as illustrated in FIG. 3. Alternatively, the system 100 may be designed to be applicable to an active shutter 3D display product and to only execute steps as illustrated in FIG. 6.

Figure 5A:
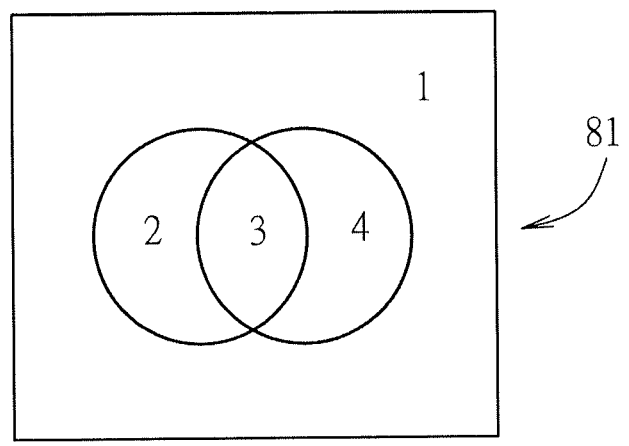
FIG. 5(A) and FIG. 5(B) are schematic diagrams respectively illustrating a processed bare-eye image and a processed behind-glass image associated with the polarized 3D technology.
Figure 5B:
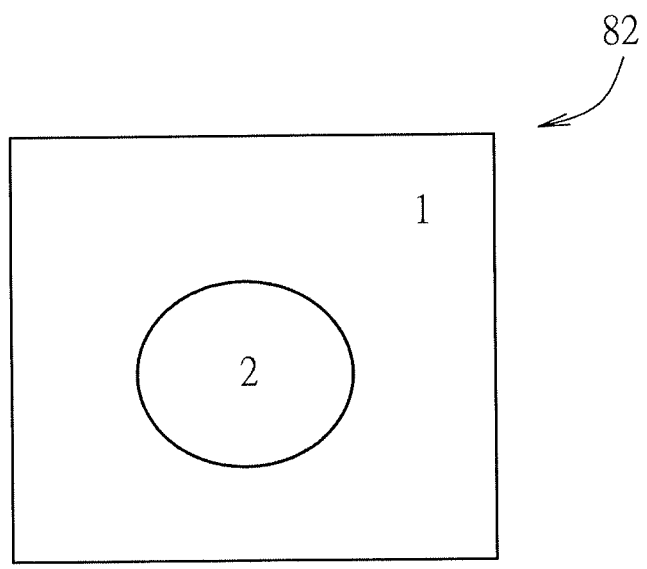

Referring to FIG. 2 and FIG. 3 in combination with FIG. 5(A) and FIG. 5(B), an embodiment of a method of the present invention is implemented by the system 100 for judging in a 3D imaging environment which adopts the polarized 3D technology. Specifically, only one of the left camera lens 11 and the right camera lens 12 that captures images is taken as an example for explaining the method of the present invention. In practice, both of the left camera lens 11 and the right camera lens 12 may capture images for subsequent analysis.

First, an input unit 6, such as a keyboard, a mouse, etc., is operated to set up a predetermined 3D image to be played back, and the 3D image is displayed by the display unit 5 (i.e., a polarized 3D display). In this embodiment, the predetermined 3D image is exemplified as an image associated with a ball (see FIG. 11). The predetermined 3D image includes the left-eye image and the right-eye image. Each of the left-eye image and the right-eye image contains the pattern of a circle that defines two enclosed areas of a respective one of the left-eye image and the right-eye image, i.e., an area inside the circle, and an area outside the circle and inside a border of the left-eye image or the right-eye image. It is noted that the predetermined 3D image is not limited to the disclosure herein, and may be selected from the group consisting of a circle, an ellipse, a convex polygon and combinations thereof. Subsequently, steps S11 to S15 at a left-hand side of a flow chart of FIG. 3, and steps S21 to S25 at a right-hand side of the flow chart of FIG. 3 are performed respectively, in no particular order.

Figure 11:
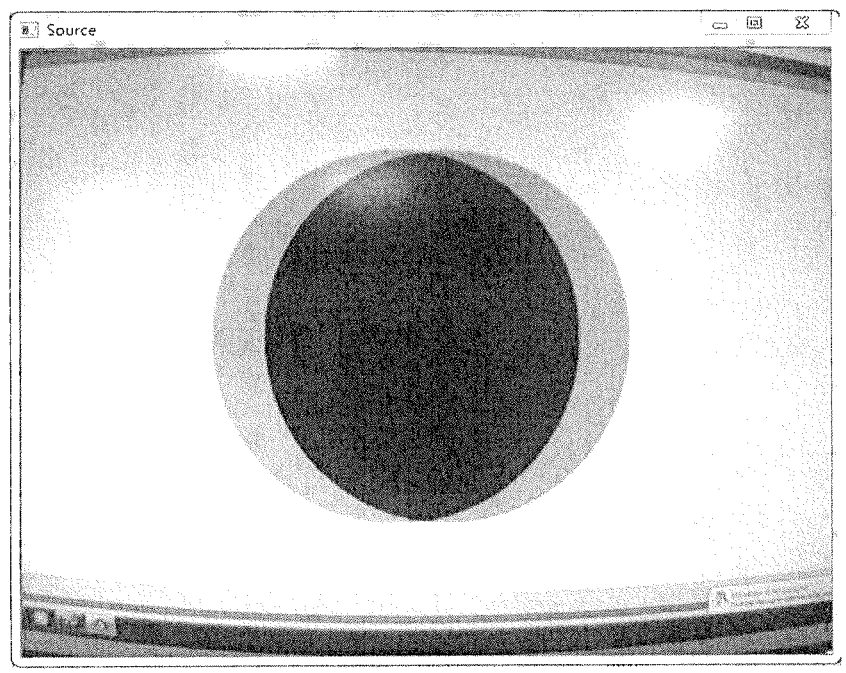
FIG. 11 is an example of the bare-eye image captured without the aid of 3D glasses.

In step S11, the image capturing unit 1 captures the first image, i.e., the bare-eye image containing superimposed images as shown in FIG. 11, of the predetermined 3D image displayed by the display unit 5 without the aid of the polarized 3D glasses 21. On the other hand, in step S21, the polarized 3D glasses 21 are arranged in front of the image capturing unit 1, and subsequently, in step S22, the image capturing unit 1 captures the second image, i.e., the behind-glass image without superimposed images, of the predetermined 3D image displayed by the display unit 5 with the polarized 3D glasses 21 arranged in front of the image capturing unit 1.

Referring once again to FIG. 2, the processing unit 3 is coupled to the image capturing unit 1, and executes a program stored in a memory unit 4 so as to operate as an image processing module 31 and an area number determination module 32. In step S12, the image processing module 31 receives from the image capturing unit 1 the bare-eye image. In step S13, the image processing module 31 processes the bare-eye image according to steps illustrated in FIG. 4 so as to obtain a processed bare-eye image. On the other hand, in step S23, the image processing module 31 receives from the image capturing unit 1 the behind-glass image. In step S24, the image processing module 31 processes the behind-glass image according to steps illustrated in FIG. 4 so as to obtain a processed behind-glass image.

A purpose of image processing of S13 or S24 is to facilitate precise discerning of the enclosed areas contained in one of the bare-eye image and the behind-glass image. A detailed procedure associated with one of the steps S13 and S24 relevant to image processing is illustrated in FIG. 4, and the bare-eye image is taken as an example for explanation in the following paragraphs.

Figure 4:
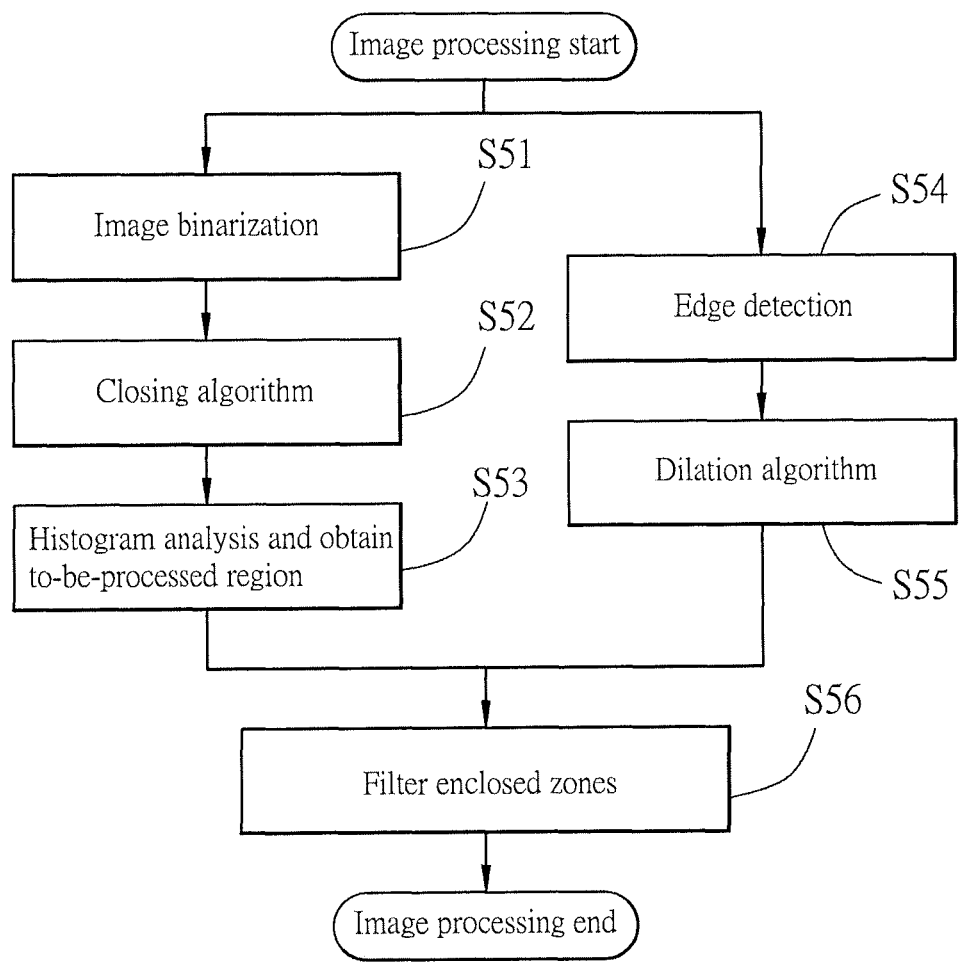
FIG. 4 is a flow chart illustrating a detailed procedure associated with a step of image processing in the embodiment of the method of FIG. 3 according to the present invention.
Figure 12:
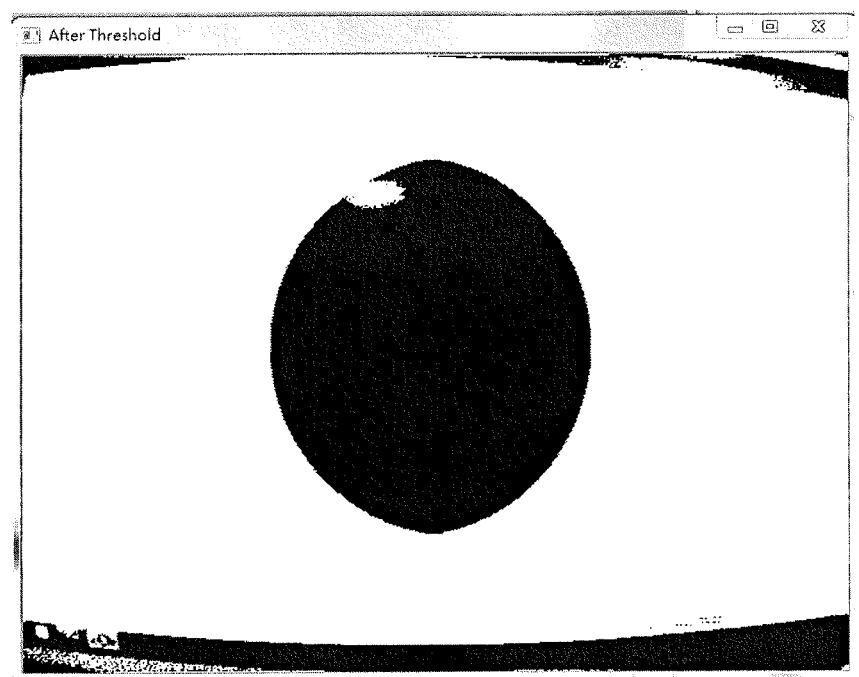
FIG. 12 is an example of the bare-eye image subjected to processing that includes image binarization.

Referring to FIG. 4, in step S51, the image processing module 31 of the processing unit 3 subjects the bare-eye image to processing that includes image binarization, so as to obtain a binary image that only has black and white color values as shown in FIG. 12.

In step S52, the image processing module 31 of the processing unit 3 subjects the binary image obtained in step S51 to computation according to a closing algorithm so as to reduce noise in the bare-eye image which has undergone the processing that includes image binarization. Specifically, the closing algorithm includes a dilation algorithm followed by an erosion algorithm. An image that has undergone the computation according to the closing algorithm is relatively clear and has less noise. The aforementioned steps S51 and S52 are performed for the sake of obtaining a more accurate result of the subsequent step S53.

Figure 13:
FIG. 13 is an example of the bare-eye image, which has been subjected to the processing including image binarization, undergoing histogram analysis.

In step S53, the image processing module 31 of the processing unit 3 performs histogram analysis on the bare-eye image, which has undergone the processing including image binarization in step S51 followed by computation according to the closing algorithm in step S52, along a vertical direction and a horizontal direction, and obtains a to-be-processed region based on results of the histogram analysis. It is noted that since the disposition of the image capturing unit 1 depends on human behavior, the pattern contained in the captured bare-eye image is not necessarily located near a center of the bare-eye image. Therefore, this step is performed for the purpose of finding the location of the pattern in the bare-eye image, and confines a to-be-processed region in the bare-eye image. Specifically, when the image processing unit 31 is performing the histogram analysis on the binary image that has undergone the computation of the closing algorithm along the vertical direction, a histogram in the bottom left-hand corner of FIG. 13 is obtained. Similarly, when the image processing unit 31 is performing the histogram analysis on the binary image that has undergone the computation of the closing algorithm along the horizontal direction, a histogram in the top right-hand corner of FIG. 13 is obtained. In this way, a horizontal interval (i.e., an X interval) and a vertical interval (i.e., a Y interval) that have relatively high statistic values may be determined, and the to-be-processed region may be obtained based on these intervals.

On the other hand, the image processing module 31 further performs steps S54 and S55 on the bare-eye image received in S12.

Figure 14:
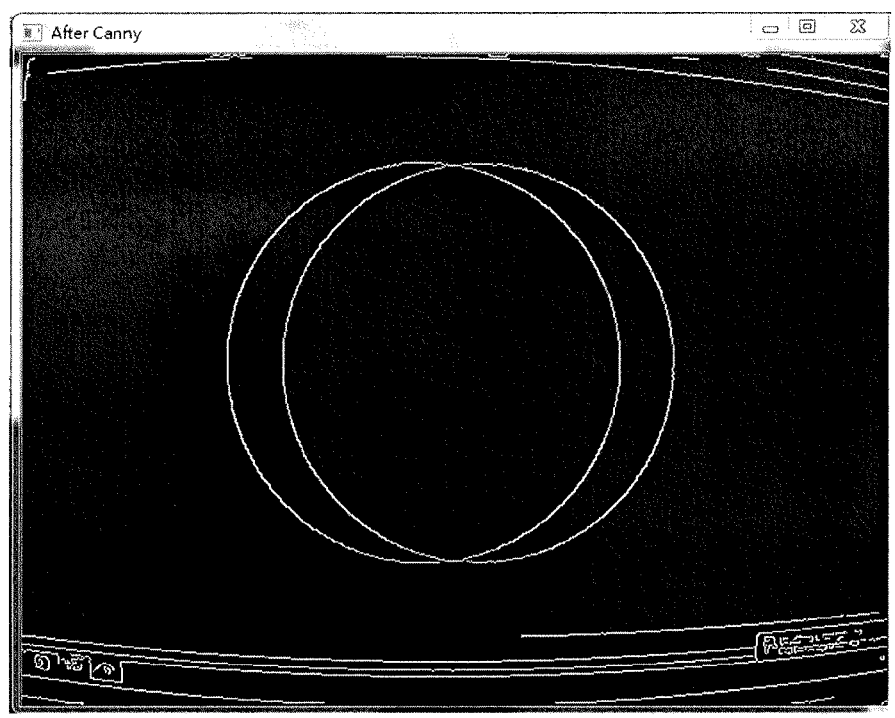
FIG. 14 is an example of the bare-eye image that undergoes edge detection.

In step S54, the image processing module 31 of the processing unit 3 performs edge detection on the bare-eye image. In this embodiment, the Canny edge detection is adopted to detect edges in the bare-eye image so as to obtain a result shown in FIG. 14. It is noted that the result of edge detection is not limited to a black background and white outlines, and may have a white background and black outlines.

Figure 15:
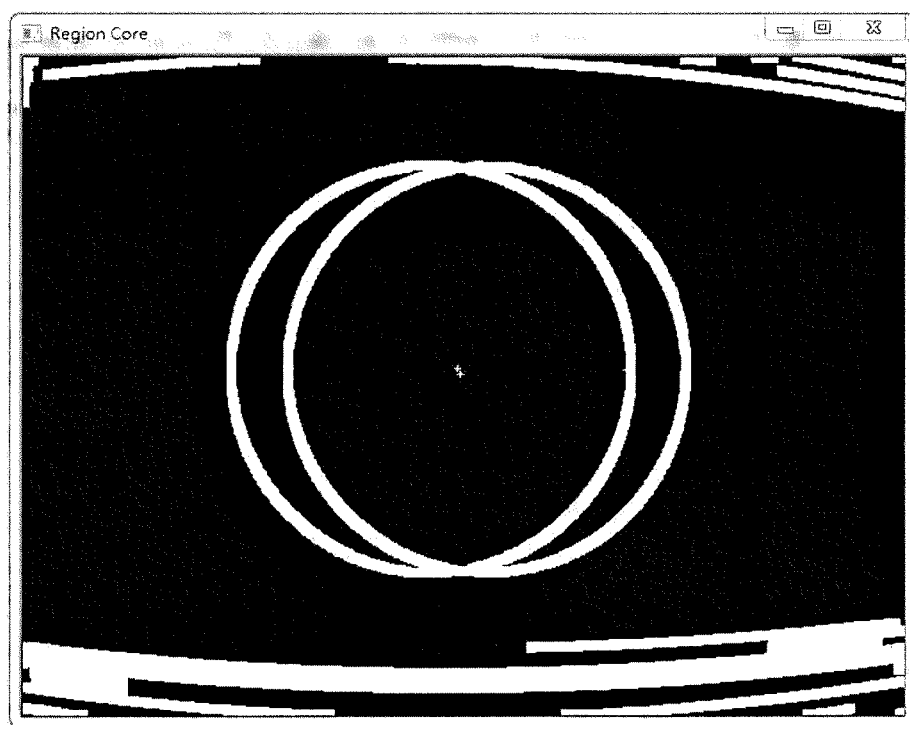
FIG. 15 is an example of the bare-eye image, which has undergone edge detection, being subjected to computation according to a dilation algorithm.

In step S55, the image processing module 31 of the processing unit 3 subjects the result obtained in step S54 to computation according to a dilation algorithm so as to thicken the edges of the pattern contained in an image as shown in FIG. 15 for the sake of a following filtering process.

In step S56, the image processing module 31 of the processing unit 3, based on the result obtained in step S55 and based on the to-be-processed region obtained in step S53, filters enclosed zones contained in the image shown in FIG. 15. Specifically, this step includes creating a matrix of pixels that has dimensions equal to those of the image shown in FIG. 15, and setting a frame of the matrix of pixels to have a value of −1, such that the frame serves as a candidate for processing. In this way, the smaller enclosed zones can be merged with the largest enclosed zone so as to reduce complexity in processing and to speed up the process. Subsequently, the remaining enclosed zones are to be filtered. In this embodiment, two conditions are used for the filtering process. First, since each of the enclosed zones should have an area within a predetermined range, the processing unit 3 is configured to calculate an area of each of the enclosed zones, and to filter out each of the enclosed zones that has an area smaller than a predetermined value, that is to say, filtering out the smaller enclosed zones which are likely associated with image noise. Second, since a geometric center of each of the enclosed zones should be located within the to-be-processed region, i.e., a region confined by the X interval and the Y interval obtained in step S53, the processing unit 3 is configured to recognize enclosed zones contained in the bare-eye image based on the result obtained in step S55, to obtain the geometric center of each of the enclosed zones, and to filter out each of the enclosed zones that has the geometric center not located within the to-be-processed region obtained in step S53 so as to obtain the processed bare-eye image.

When the bare-eye image has undergone the aforementioned processes, theoretically, the processed bare-eye image 81 as best shown in FIG. 5 (A) may be obtained. Similarly, when the behind-glass image has undergone the aforementioned processes, theoretically, the processed behind-glass image 82 as best shown in FIG. 5(B) may be obtained.

Referring once again to FIG. 3, subsequent to step S13, in step S14, the image processing module 31 of the processing unit 3 calculates offset of a pattern contained in the processed bare-eye image 81 based on a dimension of the pattern or a ratio between a length and a width of the pattern. The wider the pattern, the more evident a 3D effect of the 3D imaging environment is. Therefore, the offset serves as a parameter associated with the 3D effect of the 3D imaging environment. The processing unit 3 may further store the offset in the memory unit 4 for subsequent use.

On the other hand, the area number determination module 32 of the processing unit 3, in step S15, is configured to obtain a number (b) of enclosed areas contained in the processed bare-eye image 81, and in step S25, is configured to obtain a number (g) of enclosed areas contained in the processed second image 82. In this embodiment, a conventional computation according to the region growing algorithm is utilized for calculating the numbers of the enclosed areas. A first one of the enclosed areas is given a number of one, and remaining ones of the enclosed areas are respectively given incremental numbers by an increment of one. In this way, the last number thus given serves as the number of the enclosed areas.

Since the predetermined 3D image displayed by the display unit 5 has been decided in advance, for a 3D imaging environment that is functioning normally, a number of enclosed areas contained in each of an image captured without the aid of the 3D glasses (i.e., a standard bare-eye image) and an image captured with the 3D glasses arranged in front of the image capturing unit 1 (i.e., a standard behind-glass image) should be determined in advance. Therefore, in step S3, the area number determination module 32 of the processing unit 3 determines whether the number (b) of the enclosed areas contained in the processed bare-eye image is equal to a predetermined number ($b_s$) of enclosed areas associated with the standard bare-eye image, and whether the number (g) of the enclosed areas contained in the processed behind-glass image is equal to a predetermined number ($g_s$) of enclosed areas associated with the standard behind-glass image. In this embodiment, the predetermined number ($b_s$) of enclosed areas associated with the standard bare-eye image is four, and the predetermined number ($g_s$) of enclosed areas associated with the standard behind-glass image is two.

According to results of determinations made by the processing unit 3 in step S3, in step S41, when the number (b) of the enclosed areas contained in the processed bare-eye image is four ($b_s$), and when the number (g) of the enclosed areas contained in the processed behind-glass image is not two ($g_s$), this means that the predetermined 3D image displayed by the display unit 5 actually has the 3D effect and that the polarized 3D glasses 21 might be malfunctioning. Therefore, a corresponding notification is outputted by an output unit 7, such as a speaker, the display unit 5, or another display unit.

In step S42, when the number (b) of the enclosed areas contained in the processed bare-eye image is four ($b_s$), and when the number (g) of the enclosed areas contained in the processed behind-glass image is two ($g_s$), this means that the predetermined 3D image displayed by the display unit 5 actually has the 3D effect and that the polarized 3D glasses 21 is functioning normally, i.e., the whole 3D imaging environment is functioning normally. Therefore, a corresponding notification is outputted by the output unit 7.

In step S43, when the number (b) of the enclosed areas contained in the processed bare-eye image is not four ($b_s$), and when the number (g) of the enclosed areas contained in the processed behind-glass image is not two ($g_s$), this means that the whole 3D imaging environment is malfunctioning. Therefore, a corresponding notification is outputted by the output unit 7.

In step S44, when the number (b) of the enclosed areas contained in the processed bare-eye image is not four ($b_s$), and when the number (g) of the enclosed areas contained in the processed behind-glass image is two ($g_s$), this means that the predetermined 3D image displayed by the display unit 5 does not have the 3D effect. This situation may result from an issue associated with mode switching of the display unit 5 (e.g., only the left-eye image is displayed), or an issue associated with the file of the predetermined 3D image. Therefore, a corresponding notification is outputted by the output unit 7.

As noted above, by virtue of the method for judging in a 3D imaging environment according to the present invention, whether the 3D imaging environment is functioning normally may be automatically judged. Moreover, the method may even determine which part of the 3D imaging environment is malfunctioning in the event that the 3D imaging environment is judged as functioning abnormally.

Referring to FIG. 2 in combination with FIG. 6, FIG. 7, FIG. 8(A) and FIG. 8(B), an embodiment of a method of the present invention is implemented by the system 100 for judging in a 3D imaging environment which adopts the active shutter 3D technology. For the purpose of detecting the active shutter 3D display, the predetermined 3D image adopted in this embodiment is an image associated with a rectangle (see FIG. 8(A) and FIG. 8(B)). The reason for this resides in that since the pattern contained in the captured image is prone to have broken lines, it is easier to fix the broken lines, i.e., to fill in a gap between two terminal points of the broken lines, for a pattern with a rectangular shape. Obviously, the predetermined 3D image suitable for the present invention is not limited to the disclosure herein, and may be selected from the group consisting of a rectangle, an ellipse, a convex polygon and combinations thereof.

With respect to main processes, the method for judging in the 3D imaging environment which adopts the active shutter 3D technology in FIG. 6 is similar to the method for judging in the 3D imaging environment which adopts the polarized 3D technology in FIG. 3, and differs primarily from the latter in the detailed procedure associated with the steps of image processing S13' and S24'. Owing to different characteristics of the images thus captured, a distinct solution for the steps of image processing is adopted in this embodiment. Further, in the determination step of S3', the predetermined number ($b_s$) of the enclosed areas associated with the standard bare-eye image is still four, and the predetermined number ($g_s$) of the enclosed areas associated with the standard behind-glass image is still two. It is noted that, if a current non-customized equipment is utilized in the present invention, the processed behind-glass image may be exemplified as an image 93 illustrated in FIG. 8(C), so that the predetermined number ($g_s$) of the enclosed areas associated with the standard behind-glass image may be changed to three. Since the main processes of the method for judging in the 3D imaging environment which adopts the active shutter 3D technology are similar to those of the method for judging in the 3D imaging environment which adopts polarized 3D technology, detailed descriptions of the same are not repeated herein for the sake of brevity.

Figure 7:
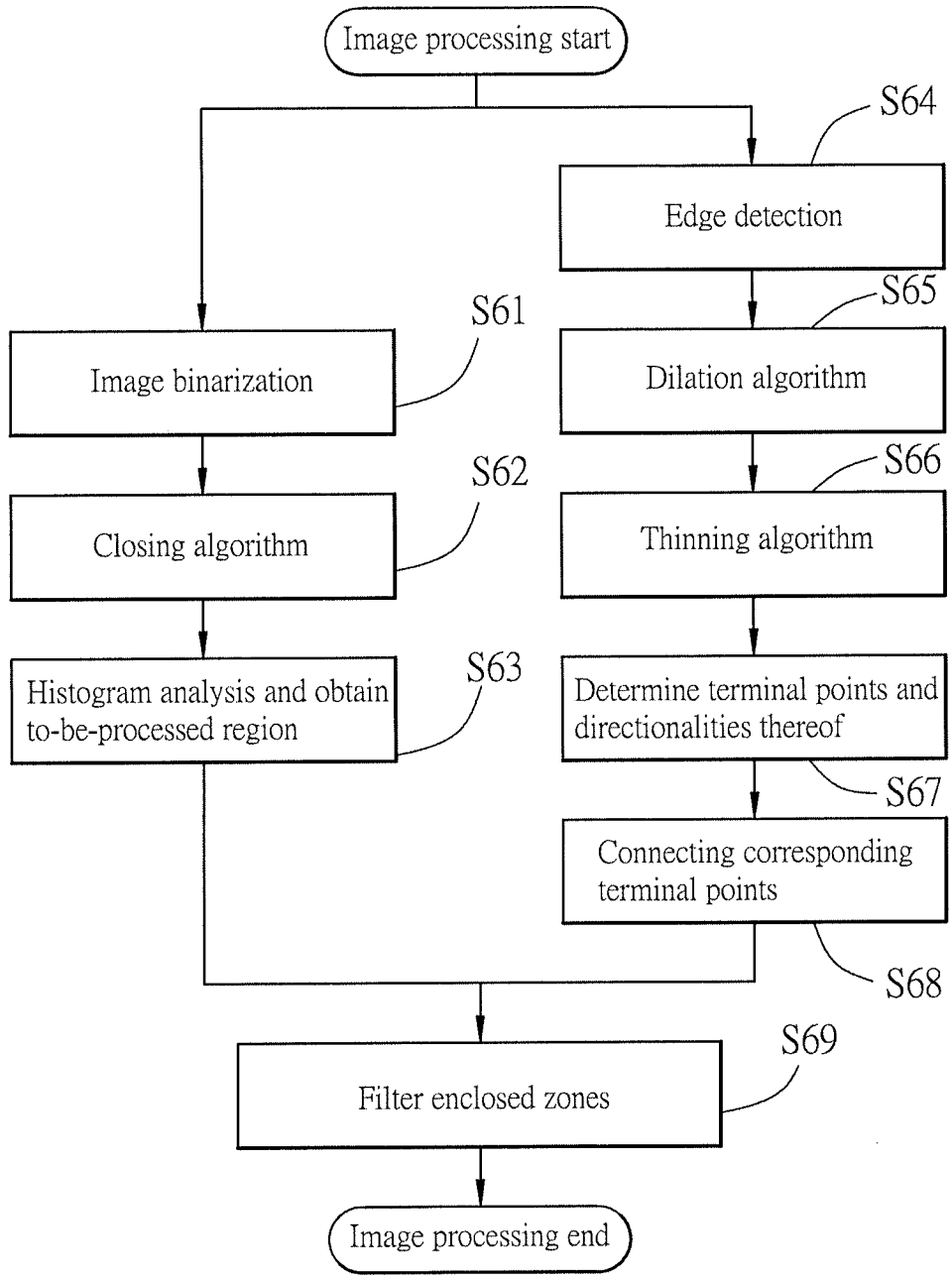
FIG. 7 is a flow chart illustrating a detailed procedure associated with a step of image processing in the embodiment of the method of FIG. 6 according to the present invention.

The detailed procedure associated with the step of image processing S13' or S24' is illustrated in FIG. 7, and the bare-eye image is taken as an example for explaining the detailed procedure. The detailed procedure includes steps S61 to S63 and steps S64 to S68 which are performed in parallel and in no particular order, and further includes a step S69 that is performed subsequent to the aforementioned steps S63 and S68.

In step S61, the image processing module 31 of the processing unit 3 subjects the bare-eye image to processing that includes image binarization, so as to obtain a binary image that only has black and white color values.

In step S62, the image processing module 31 of the processing unit 3 subjects the binary image obtained in step S61 to computation according to a closing algorithm so as to reduce noise in the bare-eye image which has undergone the processing that includes image binarization.

In step S63, the image processing module 31 of the processing unit 3 performs histogram analysis on the bare-eye image, which has undergone the processing including image binarization in step S61 followed by computation according to the closing algorithm in step S62, along a vertical direction and a horizontal direction, and obtains a to-be-processed region based on results of the histogram analysis. The to-be-processed region thus obtained is utilized for later processing in step S69.

In step S64, the image processing module 31 of the processing unit 3 performs edge detection on the bare-eye image received in step S12.

In step S65, the image processing module 31 of the processing unit 3 subjects the result obtained in step S64 to computation according to a dilation algorithm.

Figure 9:
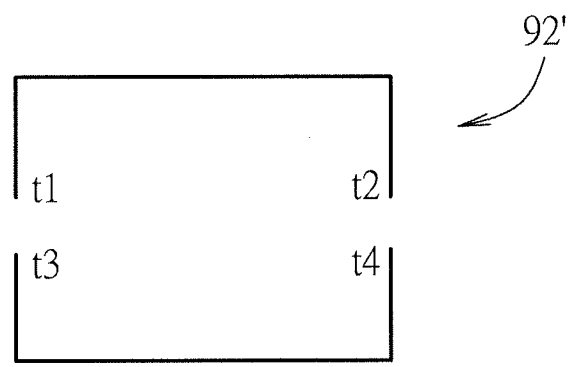
FIG. 9 is a schematic diagram illustrating broken lines in the behind-glass image associated with the active shutter 3D technology.

It is noted that, for the behind-glass image obtained in the 3D imaging environment which adopts the active shutter 3D technology, since the active shutter 3D glasses 22 is configured to alternately block one of the left eye and the right eye in a specific frequency, the behind-glass image thus captured with the active shutter 3D glasses arranged in front of the image capturing unit 1 is prone to have severe broken lines as best shown in FIG. 9. The computation according to the dilation algorithm performed in this step may substantially mitigate this issue.

In step S66, to facilitate fixing of the broken lines in the behind-glass image, the image processing module 31 of the processing unit 3 subjects the behind-glass image, that has undergone the edge detection in step S64 and the computation according to the dilation algorithm in step S65, to computation according to a thinning algorithm so as to obtain a thinning-processed behind-glass image in which all lines contained therein are reduced to single pixel thickness, that is, a skeleton of the pattern contained in the image resulting from step S65 is obtained.

In step S67, the image processing module 31 of the processing unit 3 determines terminal points of the lines in the thinning-processed behind-glass image, and directionalities of the terminal points. Specifically, a pixel on the lines in the thinning-processed behind-glass image which has only one pixel adjacent thereto is determined as one of the terminal points. Taking an image 92' illustrated in FIG. 9 as an example for explanation, the terminal points t1 and t2 have a downward directionality, and the terminal points t3 and t4 have an upward directionality.

In step S68, for each of the terminal points, the image processing module 31 of the processing unit 3 determines a corresponding one of the terminal points to serve as a connecting point thereof. A first condition to determine the connecting point is that the terminal point with a downward directionality must correspond to one of the terminal points with an upward directionality. For example, the terminal points t3 and t4 with the upward directionality are selected to serve as candidates for the connecting point of the terminal point t1 with the downward directionality. A second condition to determine the connecting point is that one of the candidates having a smallest distance with respect to the terminal point to be connected is decided to be the connecting point for the terminal point. The image processing module 31 of the processing unit 3 then processes the thinning-processed behind-glass image by connecting each of the terminal points to the connecting point corresponding thereto, thereby obtaining an intermediate behind-glass image to be operated upon by the processing unit 3 in the subsequent step S69.

In step S69, the image processing module 31 of the processing unit 3 filters enclosed zones contained in one of the bare-eye image and the behind-glass image which has undergone the process of step S68. Specifically, the processing unit 3 filters out the smaller enclosed zones which are likely associated with image noise, and filters out each of the enclosed zones that has the geometric center not located within the to-be-processed region obtained in step S63 so as to obtain a respective one of the processed bare-eye image and the processed behind-glass image.

Figure 8A:
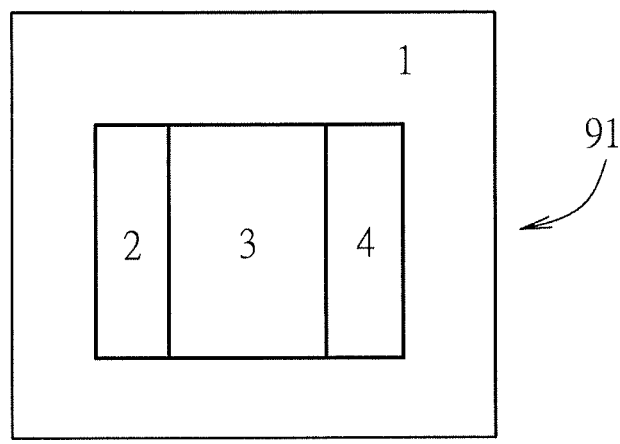
FIG. 8(A) and FIG. 8(B) are schematic diagrams respectively illustrating a processed bare-eye image and a processed behind-glass image associated with the active shutter 3D technology.
Figure 8B:
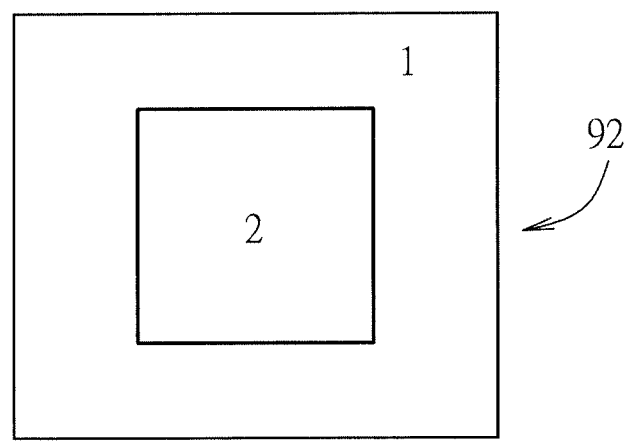
Figure 8C:
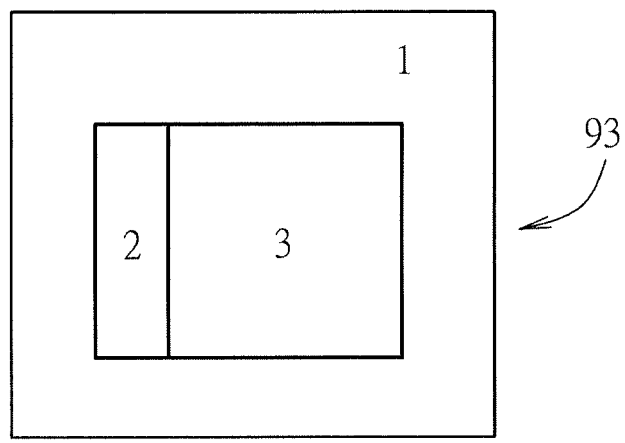
FIG. 8(C) is a schematic diagram illustrating a processed behind-glass image associated with a current non-customized equipment.

When the bare-eye image has undergone the aforementioned detailed procedure associated with the step of image processing S13', theoretically, the processed bare-eye image 91 as best shown in FIG. 8 (A) may be obtained. Similarly, when the behind-glass image has undergone the aforementioned detailed procedure associated with the step of image processing S24', theoretically, the processed behind-glass image 92 as best shown in FIG. 8(B) may be obtained.

Afterwards, referring once again to FIG. 6, the subsequent steps S15, S25, S3', and S41 to S44 are performed accordingly, so as to judge whether the 3D imaging environment which adopts the active shutter 3D technology is functioning normally. Since operations of these steps are similar to those of the method associated with the polarized 3D technology as illustrated in FIG. 3, detailed descriptions of the same are not repeated herein for the sake of brevity.

Figure 10:
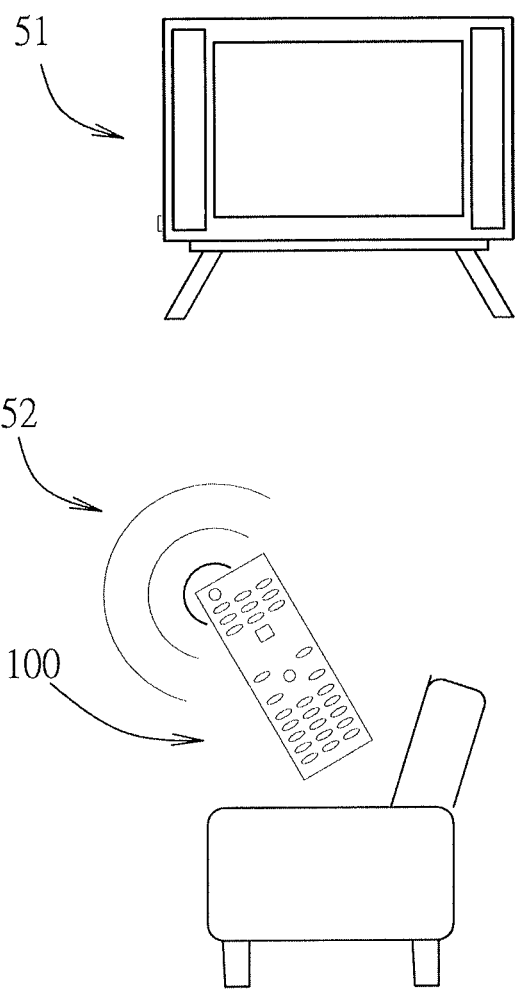
FIG. 10 is a schematic diagram illustrating practical application of the present invention.

Referring to FIG. 2 and FIG. 10, a second embodiment of the system 100 for judging in a 3D imaging environment according to the present invention is integrated into a remote control 52 of a 3D display 51. Compared with a conventional remote control, the remote control 52 at least includes the image capturing unit 1, the polarized 3D glasses 21 and/or the active shutter 3D glasses 22, and the processing unit 3. The polarized 3D glasses 21 and/or the active shutter 3D glasses 22 are configured to move in front of the image capturing unit 1 and away from the image capturing unit 1 automatically. In this way, the system 100 is able to judge in a 3D imaging environment including the 3D display 51 displaying a 3D image. Since a method performed by the system 100 to make the judgment in the second embodiment is similar to that performed by the first embodiment, detailed descriptions of the same are not repeated herein. A result of the judgment may be fed back to the remote control 52 for subsequent control associated with 3D display. Alternatively, an indication associated with the result of the judgment may be outputted using a display screen or a speaker. The 3D display 51 proceeds to operate when the 3D imaging environment is judged to be functioning normally.

To sum up, the method and the system for judging in a 3D imaging environment according to the present invention are able to automatically judge whether each of the display unit 5, a file associated with the predetermined 3D image, and the polarized 3D glasses 21 and/or the active shutter 3D glasses is functioning normally.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for judging in a three-dimensional (3D) imaging environment that uses a display unit to display a predetermined 3D image, the predetermined 3D image including a left-eye image and a right-eye image, each of the left-eye image and the right-eye image containing a pattern that defines a preset number of enclosed areas of a respective one of the left-eye image and the right-eye image, the method to be implemented by a processor and comprising the steps of:

(A) receiving, by the processor, a first image and a second image of the predetermined 3D image displayed by the display unit, the first image being captured by an image capturing unit without the aid of 3D glasses, the second image being captured by the image capturing unit with the 3D glasses arranged in front of the image capturing unit;

(B) processing, by the processor, each of the first image and the second image so as to obtain a respective one of a processed first image and a processed second image;

(C) obtaining, by the processor, a number of enclosed areas contained in the processed first image, and a number of enclosed areas contained in the processed second image; and (D) determining, by the processor, whether the number of the enclosed areas contained in the processed first image is equal to a predetermined number of enclosed areas associated with a standard first image, and whether the number of the enclosed areas contained in the processed second image is equal to a predetermined number of enclosed areas associated with a standard second image;

wherein the 3D imaging environment is functioning normally when results of determinations made by the processor in step (D) are affirmative.

2. The method according to claim 1, the display unit being a polarized 3D display, the 3D glasses being polarized glasses, the pattern contained in each of the left-eye image and the right-eye image being selected from the group consisting of a circle, an ellipse, a convex polygon and combinations thereof;

wherein the predetermined number of enclosed areas associated with the standard first image is four, and the predetermined number of enclosed areas associated with the standard second image is two.

3. The method according to claim 1, the display unit being an active shutter 3D display, the 3D glasses being active shutter glasses, the pattern contained in each of the left-eye image and the right-eye image being selected from the group consisting of a rectangle, an ellipse, a convex polygon and combinations thereof;

wherein the predetermined number of enclosed areas associated with the standard first image is four, and the predetermined number of enclosed areas associated with the standard second image is two.

4. The method according to claim 1, wherein step (B) includes the sub-steps of:
   (B1) performing, by the processor, histogram analysis on one of the first image and the second image along a vertical direction and a horizontal direction, and obtaining a to-be-processed region based on results of the histogram analysis;
   (B2) performing, by the processor, edge detection on said one of the first image and the second image; and
   (B3) by the processor, recognizing enclosed zones contained in said one of the first image and the second image based on a result obtained in step (B2), obtaining a geometric center of each of the enclosed zones, and filtering out each of the enclosed zones that has the geometric center not located within the to-be-processed region obtained in step (B1) so as to obtain a corresponding one of the processed first image and the processed second image.

5. The method according to claim 4, wherein the sub-step (B3) includes:
   calculating, by the processor, an area of each of the enclosed zones; and
   filtering out, by the processor, each of the enclosed zones that has an area smaller than a predetermined value.

6. The method according to claim 4, wherein the sub-step (B3) includes:
   creating, by the processor, a matrix of pixels that has dimensions equal to those of the result obtained in step (B2); and
   setting, by the processor, a frame of the matrix of pixels to have a value of −1 so as to enable the frame to serve as a candidate for processing, so that the smaller enclosed zones can be merged with the largest enclosed zone.

7. The method according to claim 4, wherein step (B) further includes, prior to the sub-step (B1), the sub-step of:
   subjecting, by the processor, said one of the first image and the second image to processing that includes image binarization followed by computation according to a closing algorithm so as to reduce noise in said one of the first image and the second image.

8. The method according to claim 4, wherein step (B) further includes, between the sub-steps (B2) and (B3), the sub-steps of:
   subjecting, by the processor, the second image that has undergone the edge detection to computation according to a thinning algorithm so as to obtain a thinning-processed second image in which all lines contained therein are reduced to single pixel thickness;
   determining, by the processor, terminal points of the lines in the thinning-processed second image, and directionalities of the terminal points;
   for each of the terminal points, determining, by the processor, a corresponding other one of the terminal points to serve as a connecting point thereof; and
   processing, by the processor, the thinning-processed second image by connecting each of the terminal points to the connecting point corresponding thereto, thereby obtaining an intermediate second image to be operated upon by the processor as the second image in the sub-step (B3).

9. The method according to claim 1, further comprising, subsequent to step (B), the step of:
   calculating, by the processor, offset of a pattern contained in the processed first image based on a dimension of the pattern or a ratio between a length and a width of the pattern, the offset serving as a parameter associated with 3D effect of the 3D imaging environment.

10. A system for judging in a three-dimensional (3D) imaging environment that uses a display unit to display a predetermined 3D image, the predetermined 3D image including a left-eye image and a right-eye image, each of the left-eye image and the right-eye image containing a pattern that defines a preset number of enclosed areas of a respective one of the left-eye image and the right-eye image, the system comprising:
   3D glasses;
   an image capturing unit which captures a first image of the predetermined 3D image displayed by the display unit without the aid of said 3D glasses, and which captures a second image of the predetermined 3D image displayed by the display unit with said 3D glasses arranged in front of said image capturing unit; and
   a processor which is coupled to said image capturing unit and which is configured to
      receive the first image and the second image of the predetermined 3D image displayed by the display unit,
      process each of the first image and the second image so as to obtain a respective one of a processed first image and a processed second image,
      obtain a number of enclosed areas contained in the processed first image, and a number of enclosed areas contained in the processed second image, and
      determine whether the number of the enclosed areas contained in the processed first image is equal to a predetermined number of enclosed areas associated with a standard first image, and whether the number of the enclosed areas contained in the processed second image is equal to a predetermined number of enclosed areas associated with a standard second image,
   wherein the 3D imaging environment is functioning normally when results of determinations made by said processor are affirmative.

11. The system according to claim 10, the display unit being a polarized 3D display, the pattern contained in each of the left-eye image and the right-eye image being selected from the group consisting of a circle, an ellipse, a convex polygon and combinations thereof;
   wherein said 3D glasses are polarized glasses, and
   wherein the predetermined number of enclosed areas associated with the standard first image is four, and the predetermined number of enclosed areas associated with the standard second image is two.

12. The system according to claim 10, the display unit being an active shutter 3D display, the pattern contained in each of the left-eye image and the right-eye image being selected from the group consisting of a rectangle, an ellipse, a convex polygon and combinations thereof;
wherein said 3D glasses are active shutter glasses; and
wherein the predetermined number of enclosed areas associated with the standard first image is four, and the predetermined number of enclosed areas associated with the standard second image is two.

13. The system according to claim 10, wherein said processor is further configured to:
perform histogram analysis on one of the first image and the second image along a vertical direction and a horizontal direction, and obtain a to-be-processed region based on results of the histogram analysis;
perform edge detection on said one of the first image and the second image; and
recognize enclosed zones contained in said one of the first image and the second image based on a result obtained after the edge detection, obtain a geometric center of each of the enclosed zones, and filter out each of the enclosed zones that has the geometric center not located within the to-be-processed region so as to obtain a corresponding one of the processed first image and the processed second image.

14. The system according to claim 13, wherein said processor is further configured to:
calculate an area of each of the enclosed zones; and
filter out each of the enclosed zones that has an area smaller than a predetermined value.

15. The system according to claim 13, wherein said processor is further configured to:
create a matrix of pixels that has dimensions equal to those of the result obtained after the edge detection; and
set a frame of the matrix of pixels to have a value of −1 so as to enable the frame to serve as a candidate for processing, so that the smaller enclosed zones can be merged with the largest enclosed zone.

16. The system according to claim 13, wherein said processor is further configured to:
subject said one of the first image and the second image to processing that includes image binarization followed by computation according to a closing algorithm so as to reduce noise in said one of the first image and the second image.

17. The system according to claim 13, wherein said processor is further configured to:
subject the second image that has undergone the edge detection to computation according to a thinning algorithm so as to obtain a thinning-processed second image in which all lines contained therein are reduced to single pixel thickness;
determine terminal points of the lines in the thinning-processed second image, and directionalities of the terminal points;
for each of the terminal points, determine a corresponding other one of the terminal points to serve as a connecting point thereof; and
process the thinning-processed second image by connecting each of the terminal points to the connecting point corresponding thereto, thereby obtaining an intermediate second image to be operated upon by said processor as the second image from which the processed second image is obtained.

18. The system according to claim 10, wherein said processor is further configured to:
calculate offset of a pattern contained in the processed first image based on a dimension of the pattern or a ratio between a length and a width of the pattern, the offset serving as a parameter associated with 3D effect of the 3D imaging environment.

* * * * *